J. P. SIMPSON.
Top-Prop for Carriages.
No. 212,519.  Patented Feb. 18, 1879.
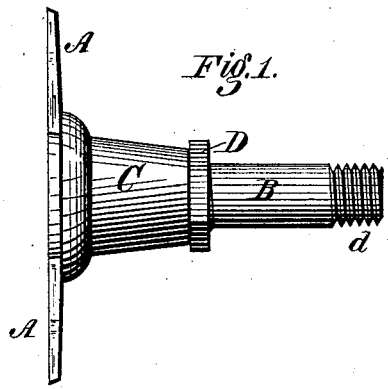
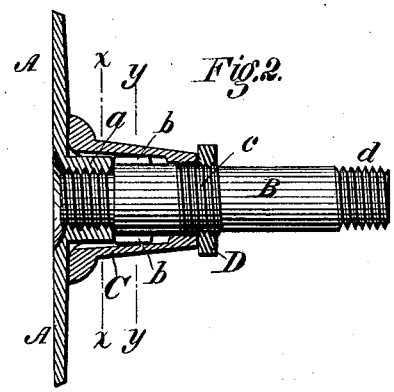
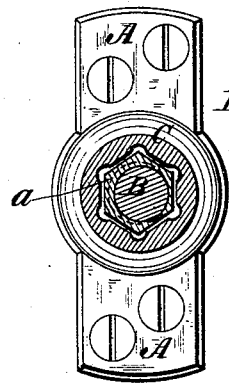
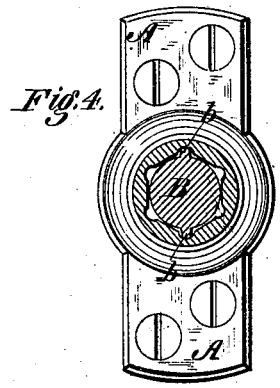
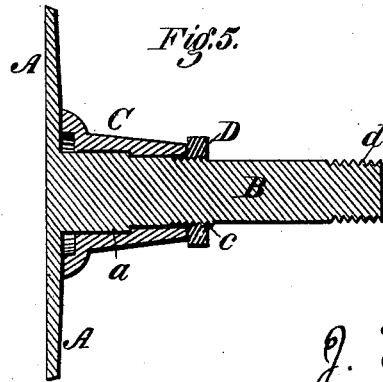
Witnesses:
Donn P. Twitchell.
D. P. Cowl.
Inventor:
J. P. Simpson
By Dodgerson
Attys.

UNITED STATES PATENT OFFICE.

JAMES P. SIMPSON, OF CINCINNATI, OHIO.

IMPROVEMENT IN TOP-PROPS FOR CARRIAGES.

Specification forming part of Letters Patent No. 212,519, dated February 18, 1879; application filed October 14, 1878.

*To all whom it may concern:*

Be it known that I, JAMES P. SIMPSON, of Cincinnati, in the county of Hamilton and State of Ohio, have invented certain Improvements in Top-Props for Carriages, of which the following is a specification:

My invention relates to that class of top-props which consist of a base-plate provided with a stud or stem having a sleeve mounted thereon; and the invention consists in the peculiar construction and combination of parts hereinafter described.

Figure 1 is a side elevation of my prop; Fig. 2, a longitudinal central section of the same; Figs. 3 and 4, cross-sections on the lines $x\ x$ and $y\ y$, respectively; Fig. 5, a sectional view, showing a modified form of the device, the stud being made in one piece with the base instead of being inserted therein.

Referring to Figs. 1 to 4, A represents the base-plate, by which the device is secured in place; B, the stud or stem; C, the sleeve, and D the nut by which the sleeve is secured in place upon the stud.

The base-plate is provided with a polygonal stud or boss, $a$, on its front face, and into this stud the threaded and shouldered inner end of the stem or stud C is screwed, as shown.

The stem or stud B is provided at its inner end with a rib or ribs, $b$, or made of an angular form in cross section, in order that it may be held from turning; and in addition to the screw-thread at its inner end it is provided with two threads, $c$ and $d$, the former located at the middle to receive the sleeve-holding nut D, and the latter located at the outer end to receive the nut by which the joints are held in place.

The sleeve C, which is slipped upon the stem or stud B over the boss $a$, and seated firmly against the base-plate, is made with a large end, so as to have a broad bearing, and is adapted to fit snugly upon the boss and the inner end of the stud B, as shown, so that it will be held from rotating by the boss, and will in turn prevent the rotation of the stud or stem. The nut D is screwed up firmly against the end of the sleeve, and serves to bind the parts firmly together.

The prop constructed as above described is very cheap and simple in construction, and is not liable to be broken down by the strain to which it will be subjected in use. The construction is particularly advantageous, in that both the stem and the sleeve are prevented from rotating, so that there is no danger of their working loose or of their loosening the nut.

Instead of making the stud or stem and the base-plate in separate pieces and screwing them together, they may be made in one piece, as represented in Fig. 5, the construction being the same in all other respects as described above, the angular boss being retained on the base-plate to prevent the rotation of the sleeve, and the latter being held by means of a nut on the middle of the stem.

I am aware that top-props have been made in a great variety of forms; that studs have been screwed into base-plates; that sleeves have been applied in different ways, and that means have been employed to prevent the rotation of the sleeve; and, therefore, I lay no claim to such features, separately considered.

What I do claim is—

1. In a top-prop, the combination of a base-plate having an angular boss, $a$, thereon, a stud or stem, B, extending from the base-plate and provided at the middle with a screw-thread, $c$, a sleeve, C, surrounding the stem B and closely embracing the boss $a$, and a nut, D, mounted on the stem and bearing firmly against the sleeve, as shown.

2. The combination of the base A, having the stud or boss $a$ thereon, the stud or stem B, having its inner end screwed into the base and provided with ribs or irregular portions $b$, and its middle provided with the thread $c$, the sleeve C, fitting closely upon the stem B and boss $a$, and the nut D, applied as shown.

3. The combination of a base-plate having a stem or stud, a sleeve fitted upon said stem, and a nut seated upon the middle of the stem and bearing against the outer end of the sleeve.

JAMES P. SIMPSON.

Witnesses:
CHAS. J. BROWN,
E. N. CLINGMAN.